March 5, 1968     P. A. CIRAUD     3,371,382
METHOD AND MEANS FOR FORMING HOLLOW ARTICLES
OUT OF A SHEET OF THERMOPLASTIC MATERIAL
Filed Oct. 11, 1965     3 Sheets-Sheet 1

Pierre Alfred Ciraud,
Inventor
By Wenderoth, Lind & Ponack,
Attorneys

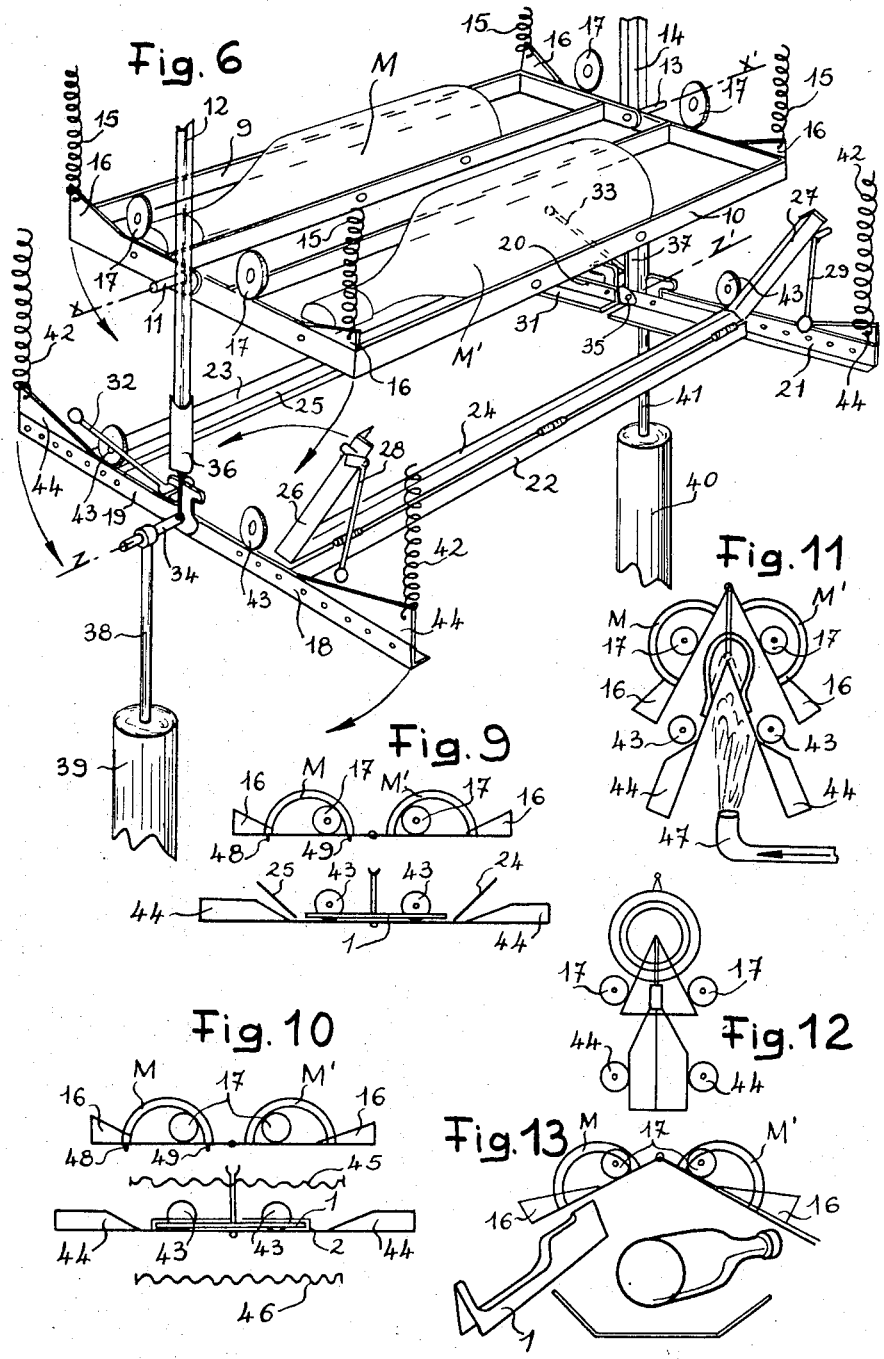

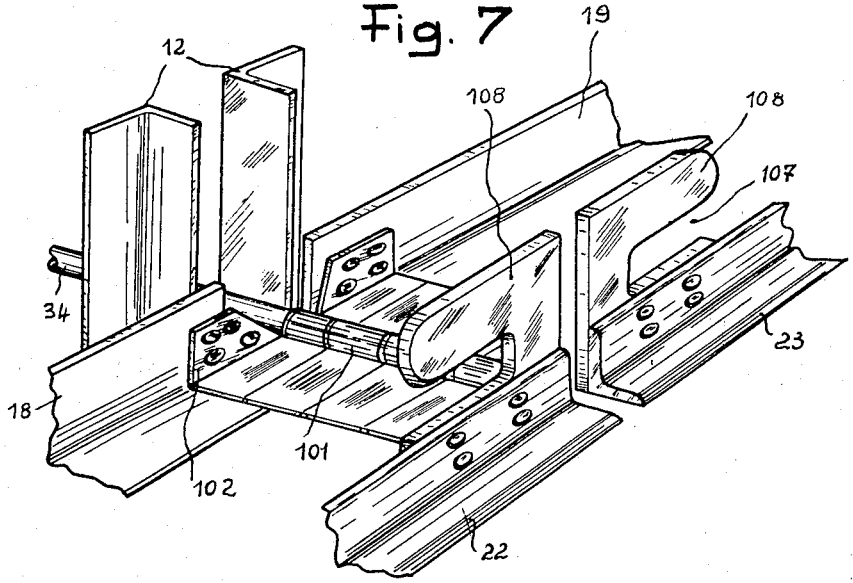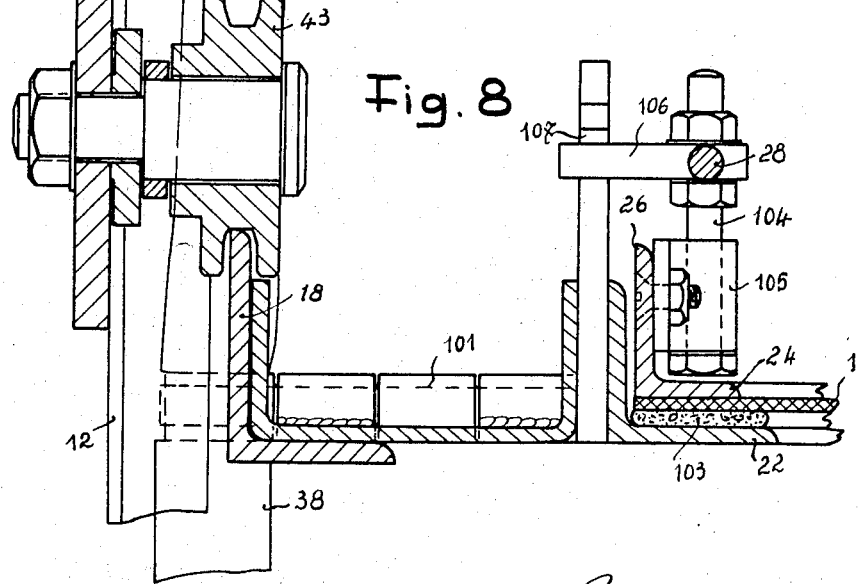

United States Patent Office 3,371,382
Patented Mar. 5, 1968

3,371,382
METHOD AND MEANS FOR FORMING HOLLOW ARTICLES OUT OF A SHEET OF THERMOPLASTIC MATERIAL
Pierre Alfred Ciraud, 115 Ave. Paul Firino-Martell, Cognac, Charente, France
Filed Oct. 11, 1965, Ser. No. 494,746
Claims priority, application France, Oct. 16, 1964, 991,803; Sept. 1, 1965, 30,029, Patent 1,457,523
12 Claims. (Cl. 18—19)

ABSTRACT OF THE DISCLOSURE

An apparatus for moulding hollow articles from thermoplastic material. There are two pivotally connected half molds which when they engage each other form a complete closed mold. Two superpositioned frames are provided which are also divided into two halves which are hingedly secured together in a line parallel to the pivoting line of the two half molds. The lower frame is adapted to hold two parallel edges of a sheet of thermoplastic material along lines parallel with the hinge of the frame and the halves of the upper frame carrying each one-half mold with it opening facing a corresponding half of the lower frame. The folding of the upper frame along its hinge engaging the half molds with each other to form a complete mold. Means are provided for heating the sheet of thermoplastic material in the lower frame to softening temperature. Means are also provided for raising the hinges of both frames to fold the latter and thereby urge the sheet on the lower frame towards the location of the inside of the mold when in its closed position and to close thereafter the mold on the upper frame over the sheet. Means are provided to make the sheet mate the inner surface of the closed mold.

My invention relates to an apparatus for producing, starting from a sheet of thermoplastic material, chiefly self-welding material, hollow articles having an outer encasing surface which may, in fact, be completely closed. The expression "thermoplastic material" should be construed to cover, generally speaking, any material adapted to be deformed under the action of heat whether a synthetic material or even a sheet of glass.

My invention has for its object a simplification in the production of articles obtained starting from a thermoplastic sheet and it bestows them with a neater appearance, chiefly by cutting out at least substantially one half of the welding line appearing of necessity on hollow articles which are completely closed.

With the above and other objects in view which will become apparent from the detailed description below, some preferred modifications of the invention are shown in the drawings, in which:

FIGS. 6 to 13 illustrate an arrangement serving for the execution of the method applied to the execution, by means of a female molding member made of two parts, of a bottle of plastic material having only one lateral line of weld.

Figure 1:
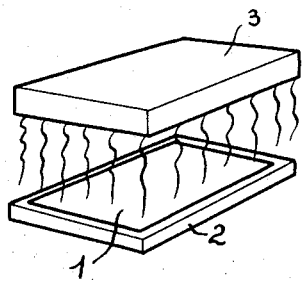
FIGS. 1 to 5 illustrate the execution of a hollow body starting from a male shaping member formed, in the case considered, by an outwardly shaped core matching the shape and inner size of the article to be executed.

More specifically:

FIG. 1 is a diagrammatic perspective view showing a heating system for raising to the desired operative temperature a thermoplastic sheet held in a rectangular edge-clamping device made of two pivotally interconnected parts.

Figure 2:
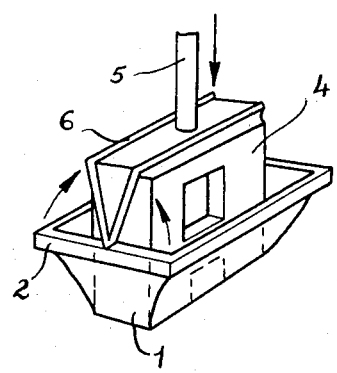

FIG. 2 is a view illustrating the deformation to which the sheet illustrated in FIG. 1 is subjected after the driving of a male shaping member or core into the softened sheet.

Figure 3:
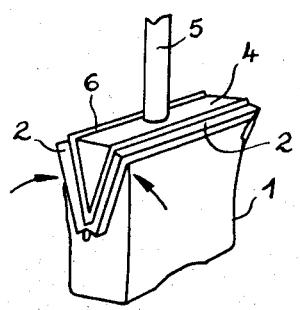
Figure 4:
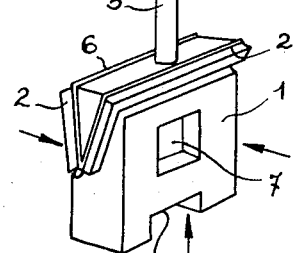

FIG. 3 is a diagrammatic view corresponding to FIG. 4 of the sheet after folding upwardly the two pivotally interconnected halves of the edge clamping means.

FIG. 4 is a view similar to FIG. 1 after suction of the plastic material into the recesses formed in the shaping core.

Figure 5:
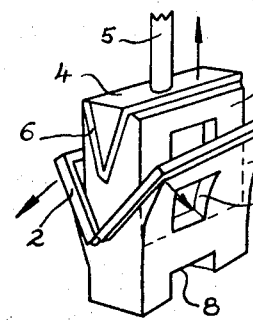

FIG. 5 is a diagrammatic perspective view illustrating the release of the shaping core out of the molded article which is provided with a sufficient elasticity.

FIG. 6 is a general diagrammatic perspective view of an arrangement adapted to produce a bottle.

FIG. 7 is a detail perspective view illustrating the pivotal connection between the parts of the edge-clamping means and showing the notched projections of the latter when cooperating with locking levers.

FIG. 8 is a sectional view of the edge-clamping means, the sectional plane being parallel with the axis of the hinge and passing through one of the guiding rollers.

FIG. 9 is a diagrammatic end view of the arrangement, the edge-clamping means being loaded and the mold being in its open position.

FIG. 10 is a view similar to FIG. 9 showing the plastic sheet subjected to the action of heating means.

FIG. 11 illustrates the first operative stage of the arrangement, the folded plastic sheet being subjected to a blast of hot air drawing it out as a preliminary step inside the open mold.

FIG. 12 illustrates the second operative stage of the arrangement, the two-part mold being closed and the sheet of plastic material being sucked in or blown against its inner wall.

FIG. 13 illustrates the last operative stage of the arrangement, the closed bottle being lifted out of the mold after a cutting out leading to the formation of a double thickness of waste material.

FIGURES 1 to 5 show that the invention consists chiefly in stretching a plastic sheet 1 inside a two-part edge-clamping device 2, raising said sheet to the softening temperature required for its shaping, which operation is performed by means of a movable heating system 3, after which, the sheet 1 being then sufficiently softened, the clamping device 2 receives the male die, which has a core 4 carried by a movable rod 5 actuated for instance by means of a jack, after which the male die is enclosed on both sides by a folding of the two parts or halves of the clamping device.

Obviously, it is also possible to allow the core 4 to remain stationary while the clamping device 2 is shifted towards it or else the two members 2 and 4 may be shifted simultaneously towards each other. Similarly, although in the case illustrated, these parts are assumed to move towards each other along a vertical axis, it is possible to provide as well their movement towards each other along any desired direction.

As may be ascertained from inspection of FIG. 2, the shaping core 4. which may be made of several sections so as to allow its subsequent removal out of the finished article obtained starting from the thermoplastic sheet 1, includes a fluidtight bead 6 of any suitable material such as rubber, silicone rubber or the like, against which the halves of the clamping device 2 are urged when in their operative folded condition, as illustrated in FIGS. 3 and 4, so that the vacuum produced round the shaping member 4 between its outer surface and the plastic sheet 1, whether merely stamped as illustrated in FIG. 2 or drawn out as illustrated in FIG. 3 may be reliable and lead to the formation of the recesses or notches such as 7 or 8 illustrated in FIG. 4.

The release of the core 4, after cooling of the article obtained starting from the thermoplastic sheet 1, may be performed, as already mentioned, by the successive removal of the sections forming the shaping core or else, when the finished article has a sufficient elasticity, it is possible to pull out directly the shaping core after spacing apart the two halves of the clamping device 2 as illustrated diagrammatically in FIG. 5.

When the method, intended for the production of a hollow article such as a bottle, resorts to a female shaping member or mold, it is necessary to resort to an arrangement which, after softening of the sheet heated to the temperature required for the shaping, allows:

(a) Folding the sheet,
(b) Possibly inflating it to a slight extent,
(c) Enclosing said sheet inside the female shaping member or mold,
(d) Closing said mold,
(e) Compressing the two free sides of the folded and possibly inflated sheet which has been introduced into the mold,
(f) Welding the sheet along the outline of the hollow article to be executed,
(g) Cutting off the outer sections of the article so as to remove the excess thermoplastic material,
(h) Constraining the sheet to match strictly the inner surface of the two-part mold,
(i) Releasing the article out of the mold after cooling.

All these operations are readily executed by means of the arrangement provided in accordance with my invention and illustrated diagrammatically by FIGS. 6 to 13. This last-mentioned arrangement is associated with suitable heating means illustrated in FIG. 10 adapted to soften the thermoplastic sheet which is stretched in registry with the shaping member; according to my invention, said arrangement includes two superposed frames constituted each by two parts pivotally connected along the medial line of said frame, the medial lines of said frames forming parallel axes; the upper frame carries the halves of the mold the opening of which face the thermoplastic sheet stretched inside the lower frame holding along its periphery the sheet of thermoplastic material to be shaped.

The upper frame includes two suitably shaped parts or halves 9 and 10, rectangular in the case illustrated, said two halves being pivotally connected together along the medial line $x-x'$ by stub shafts 11, 13 slidingly carried in corresponding grooves of vertical slideways. The stub shaft 11 at one end of the line $x-x'$ is guided by the vertical slideway 12 while the stub shaft 13 at the other end of said line $x-x'$ is guided by the vertical guideway 14.

The upper frame 9–10 is carried at its four corners by springs 15 engaging the body of the arrangement. In the case illustrated in FIG. 6, said springs are secured to wedge-shaped slopes 16 cooperating with guiding rollers 17 of which the operation will be disclosed hereinafter. The upper frame carries two mold shells M and M' forming together, after folding over each other, the shaping member. Said shells M and M' are enantiomorphous with reference to the axial line $x-x'$, i.e. they are related to one another as an object to its mirror image.

The lower frame is constituted by four angle bars 18, 19, 20 and 21( FIG. 6) pivotally secured to a hinge 101 (FIGS. 7 and 8) carrying the actual edge-clamping device and illustrated symbolically in FIG. 6 by the axial line $z-z'$. FIGS. 7 and 8 are more detailed; FIG. 7 shows only the angle bars or rails 18 and 19 of the lower frame whereas FIG. 8 shows only the angle bar 18. Said angle bars are pivotally connected two by two along the axis $z-z'$ parallel with the pivotal axis $x-x'$ of the upper frame which carries the mold shells. The flanges of the hinge 101 (FIG. 8) are rigid with U-shaped irons 102 (FIG. 7) secured on the one hand to angle bars such as 18, and carrying on the other hand the actual pivotal edge-clamping device. The latter is constituted by two supporting U-shaped half frames 22 and 23 resting on the pivotal angle bars 18, 20 and 19, 21 and by two also U-shaped clamping half-frames 24 and 25 which are hingedly secured transversely to said U-shaped half frame frames 22 and 23.

hingedly secured transversely to said U-shaped half
The sheet of plastic material 1 to be fashioned is fitted between said supporting half-frames, 22–23, on the one hand, and the associated clamping half-frames 24–25 on the other hand with the interposition of a fluid-tight packing 103.

The free upturned flanges 26 and 27 of the clamping or locking half-frame 24 are provided with locking levers 28 and 29 (of which only the lever 28 is apparent to view in FIG. 8). Said lever 28 is adapted to pivot with a trunnion 104 revolvably carried in a sleeve 105 secured to the flange 26 of the clamping half-frame 22 of the clamping device, and it carries a bolt 106 adapted to engage, through said pivoting movement, a corresponding notch 107 in a locking lug 108.

The similar locking levers provided on the free arms 30 and 31 of the clamping half-frame 25 are designated by the reference numbers 32 and 33.

The angle bars 18 and 19 are pivotally secured round a journal 34 lying in alignment with the axis of the hinge 101 and the angle bars 20 and 21 are pivotally secured round a journal 35 also in alignment with the same axis. Said journals 34 and 35 are arranged on a single axis $z-z'$ parallel with the axis $x-x'$. Said journals 34 and 35 carry forked thrust-exerting members 36 and 37 of an adjustable length which are adapted to move along the axes of the slideways 12 and 14 respectively. The journal 34 may be shifted along the axis of the slideway 12 under the action of the rod 38 of a jack 39. Similarly, a jack 40 actuates, through its rod 41, the journal 35, along the axis of the slideway 14.

The halves of the lower pivotal frame are carried by springs 42 and are guided when shifted angularly, by rollers 43 the axes of which are stationary.

At their free ends, the angle bars 18, 19, 20 and 21 carrying the different parts of the clamping device holding the thermoplastic sheet are provided with wedge shaped slopes 44. The part played by said slopes, which is identical with that played by the slopes 16 on the upper frame, will be disclosed hereinafter.

The arrangement is associated (FIG. 10) with heating means 45, 46 (FIG. 10) located to either side of the thermoplastic sheet 1 so as to ensure its softening before its shaping.

FIG. 11 shows also that the arrangement includes as an auxiliary, a nozzle 47 blowing a jet of hot air into the already folded sheet with a view to ensuring a slight preliminary inflation.

Furthermore, FIG. 9 shows two blades 48 and 49 adapted to cut off the excess of thermoplastic material.

The operation of the arrangement which has just been described is as follows:

After release of the two upper half-frames 24 and 25 of the clamping device so that they may move in a direction opposed to the arrow $F_1$ of FIG. 6, the thermoplastic sheet 1 is inserted in the supporting half-frames 22, 23, which corresponds to the position illustrated diagrammatically in FIG. 7. This being done, the heating means 45 and 46 are caused to act as shown in FIG. 8 on either side of the thermoplastic sheet 1 after the latter has been held fast in the clamping device through a folding back of the two clamping half-frames 24 and 25 and after a locking of the levers 26, 27, 28 and 29 corresponding thereto in the corresponding locking notches 107.

When the sheet has assumed the desired plasticity required for its shaping, the jacks 39 and 40 (FIG. 6) are actuated so that upon engagement with the rollers 43 the angle bars 18 and 19 and similarly the angle bars 20 and 21 which are pivotally mounted two by two on the journals 34 and 35 are caused to abut against the rollers 43 and to rock while said journals rise along the slideways 12 and 14. This leads to a folding of the sheet 1 held fast in the clamping device. A stream of hot gases is then blown through the nozzle 47 inside the folded sheet 1 (FIG. 11) so that said sheet may retain its plasticity and be slightly inflated and form through reduced stretching a sort of blank.

The rising movement of the journals 34 and 35 continues then so that the thrust-exerting forked members 36 and 37 abut against the stub shafts 11 and 13 at the ends of the axis line x–x'. The rollers 43 rise along the terminal slopes 44 which ensure the complete closing of the clamping device and, as they continue their travel, the thrust-exerting forked members 36 and 37 cause the slopes 16 on the upper frame to ride along the rollers 17, which ensures the complete closing of the mold through an engagement of the edges of the symmetrical shells M and M' against each other. At the same time, the blades 48 and 49 (FIG. 9) of the cutting means remove the excess of plastic material projecting outside the mold. The sides of the thermoweldable plastic material are welded together along the line L of the bottle blank thus formed after which gas under pressure is blown through a suitable nozzle into the blank which is stretched in the three directions of space so as to engage intimately the inner surface of the mold. It is also possible to resort, for such an operation, to a suction exerted in the gap between the mold and the plastic sheet 1.

The blank is then allowed to cool inside its mold and the rods 38 and 41 of the jacks are caused to recede. During this movement, the clamping frame returns into its flat condition and the mold opens and allows the molded bottle to be removed through gravity. It is possible to provide furthermore at such a moment a reversal between the operation of the suction pipes and of the blowing pipes so as to further the lifting of the finished article.

It is sufficient with a view to proceeding with the molding of the following bottle, to merely remove off the clamping device the cut-off waste material which is still held fast therein (FIG. 13).

Obviously, the above arrangement has been disclosed and illustrated merely by way of an explanatory example and by no means in a limiting sense and various detail modifications may be brought thereto without widening the scope of the invention, as defined in the accompanying claims. Thus, for instance, instead of being controlled by jacks, the arrangement may be controlled in any other suitable manner and it is possible to provide in alignment with the pivotal axis x–x' of the upper rocking frame, two or more pairs of mold shells. Furthermore, it is possible to associate a number of identical or different molding arrangements so as to form a unit.

What I claim is:

1. In an arrangement for molding hollow articles out of a sheet of self-welding thermoplastic material, the combination of two half-molds adapted to engage each other to form a complete closed mold, two superposed frames including both two halves hingedly secured together along parallel lines, the lower frame being adapted to hold two parallel edges of the sheet in a stretched condition along lines parallel with the hinge of the frame and the halves of the upper frame carrying each one half mold with its opening facing a corresponding half of the lower frame, the folding of said upper frame along its hinge engaging the half molds with each other to form a complete mold, means adapted to heat the sheet in the lower frame to softening temperature and means for raising the hinges of both frames to fold the latter and thereby urge the sheet on the lower frame towards the location of the inside of the mold when in its closed position and to close thereafter the mold on the upper frame over the sheet and means adapted to make the sheet mate the inner surface of the closed mold.

2. In an arrangement as claimed in claim 1, the provision of two stub shafts pivotally carrying the two halves of the upper frame along their hinge line and vertical slideways for said stub shafts.

3. In an arrangement as claimed in claim 1, the provision of two stub shafts pivotally carrying the two halves of the upper frame along their hinge line, vertical slideways for said stub shafts, springs urging upwardly the halves of the upper frame and secured thereto along their edges facing away from the frame hinges, wedge-shaped slopes formed over transverse edges of the halves of the upper frame and rising in a direction facing away from the frame hinge and rollers having stationary axes engaging said slopes to guide the frame halves during the pivotal movement thereof obtained through a rising of the stub shafts along the slideways.

4. In an arrangement for molding hollow articles out of a sheet of self-welding thermoplastic material, the combination of two half-molds adapted to engage each other to form a complete closed mold, a lower rectangular frame including two transverse pairs of pivotally connected angle bars, the common pivotal axis of said pairs being parallel with the longitudinal edges of the lower frame and defining thus a hinge for the two halves of the lower frame along said axis, means for clamping two parallel edges of the sheet in registry with the longitudinal edges of the lower frame, an upper frame extending over the lower frame and including two halves hingedly secured together along a medial line lying above and in parallelism with the hinge of the lower frame, said halves of the upper frame carrying each one half mold with its opening facing a corresponding half of the lower frame, the folding of said upper frame along its hinge engaging the half molds with each other to form a complete mold, means adapted to heat the sheet in the lower frame to softening temperature and means for raising the hinges of both frames to fold the latter and thereby urge the sheet on the lower frame towards the location of the inside of the mold when in its closed position and to close thereafter the mold on the upper frame over the sheet and means adapted to make the sheet mate the inner surface of the closed mold.

5. In an arrangement for molding hollow articles out of a sheet of self-welding thermoplastic material, the combination of two half-molds adapted to engage each other to form a complete closed mold, a lower rectangular frame including two transverse pairs of pivotally connected angle bars, the common pivotal axis of said pairs being parallel with the longitudinal edges of the lower frame and defining thus a hinge for the two halves of the lower frame along said axis, and two longitudinal U-shaped members the upper raised flanges of which are rigidly secured to the corresponding angle bars, two U-shaped clamping members hingedly secured to the longitudinal members of the lower frame and adapted in cooperation with the latter to clamp corresponding parallel edges of the sheet to hold the latter in a stretched condition, an upper frame extending over the lower frame and including two halves hingedly secured together along a medial line lying above and in parallelism with the hinge of the lower frame, said halves of the upper frame carrying each one half mold with its opening facing a corresponding half of the lower frame, the folding of said upper frame along its hinge engaging the half molds with each other to form a complete mold, means adapted to heat the sheet in the lower frame to softening temperature, means for raising the hinges of both frames to fold the latter and thereby urge the sheet on the lower frame towards the location of the inside of the mold when in its closed position and to close thereafter the mold on the upper frame over the sheet and means adapted to make the sheet mate the inner surface of the closed mold.

6. In an arrangement for molding hollow articles out of a sheet of self-welding thermoplastic material, the combination of two half-molds adapted to engage each other to form a complete closed mold, a lower rectangular frame including two transverse pairs of pivotally connected angle bars, the common pivotal axis of said pairs being parallel with the longitudinal edges of the lower frame and defining thus a hinge for the two halves of the lower frame along said axis, and two longitudinal U-shaped members the upper raised flanges of which are rigidly secured to the corresponding angle bars, two U-shaped clamping members hingedly secured to the longitudinal members of the lower frame and adapted in cooperation with the latter to clamp corresponding parallel edges of the sheet to hold the latter in a stretched condition, a locking lever pivotally secured to each end of each clamping member and lugs carried by the longitudinal members of the lower frame in registry with each locking lever and adapted to be engaged thereby to hold the cooperating clamping member in its operative condition, an upper frame extending over the lower frame and including two halves hingedly secured together along a medial line lying above and in parallelism with the hinge of the lower frame, said halves of the upper frame carrying each one half mold with its opening facing a corresponding half of the lower frame, the folding of said upper frame along its hinge engaging the half molds with each other to form a complete mold, means adapted to heat the sheet in the lower frame to softening temperature, means for raising the hinges of both frames to fold the latter and thereby urge the sheet on the lower frame towards the location of the inside of the mold when in its closed position and to close thereafter the mold on the upper frame over the sheet and means adapted to make the sheet mate the inner surface of the closed mold.

7. In an arrangement as claimed in claim 1, the provision of stub shafts pivotally carrying the two halves of the lower frame along the hinge line and vertically slideways slidingly engaged by said stub shafts.

8. In an arrangement as claimed in claim 1, the provision of stub shafts pivotally carrying the two halves of the lower frame along the hinge line, vertical slideways slidingly engaged by said stub shafts and jacks controlling the movement of the stub shafts along the slideways.

9. In an arrangement as claimed in claim 1, the provision of stub shafts pivotally carrying the two halves of the lower frame along the hinge line, vertical slideways slidingly engaged by said stub shafts, jacks controlling the movement of the stub shafts along the slideways, springs urging upwardly the outer edges of the lower frame, and rollers engaging the upper surfaces of the transverse edges of each frame to guide their pivotal movement under the action of the jacks.

10. In an arrangement as claimed in claim 1, the provision of stub shafts pivotally carrying the two halves of the lower frame along the hinge line, vertical slideways slidingly engaged by said stub shafts, jacks controlling the movement of the stub shafts along the slideways, springs urging upwardly the outer edges of the lower frame, wedge-shaped slopes formed on the transverse edges of the lower frame and rising upwardly and away from the frame hinges and rollers engaging the slopes of each frame to guide their pivotal movement under the action of the jacks.

11. In an arrangement as claimed in claim 1, the provision of means cutting off the waste material extending outwardly of the mold between the cooperating edges of the half-molds.

12. In an arrangement as claimed in claim 1, the provision of stub shafts pivotally carrying the two halves of each frame along the hinge line, vertical slideways slidingly engaged by said stub shafts, jacks controlling the movement of the stub shafts along the slideways, springs urging upwardly the outer edges of each frame, wedge-shaped slopes formed on the transverse edges of each frame and rising upwardly and away from the frame hinge and rollers engaging the slopes of each frame to guide their pivotal movement under the action of the jacks.

References Cited

UNITED STATES PATENTS

| | | | |
|---|---|---|---|
| 2,486,761 | 11/1949 | Pfeiffer | 53—141 X |
| 2,493,439 | 1/1950 | Braund | 18—19 X |
| 2,846,819 | 8/1958 | Baker | 18—19 X |
| 2,968,064 | 1/1961 | Howell | 18—19 |
| 3,010,152 | 11/1961 | Braund | 18—19 X |
| 3,013,301 | 12/1961 | Lang | 18—19 |
| 3,196,488 | 7/1965 | Jones-Hinton et al. | 18—19 |
| 3,258,813 | 7/1966 | Groth et al. | 18—19 |
| 3,263,008 | 7/1966 | Berder | 18—19 X |

FOREIGN PATENTS

| | | |
|---|---|---|
| 582,591 | 9/1958 | Italy. |

WILLIAM J. STEPHENSON, *Primary Examiner.*